(12) United States Patent
De Luca et al.

(10) Patent No.: US 9,599,131 B2
(45) Date of Patent: Mar. 21, 2017

(54) VIBRATION DAMPING SYSTEM BY MEANS OF A HYDRAULIC ACTUATION SYSTEM

(71) Applicant: Danieli & C. Officine Meccaniche S.P.A., Buttrio (IT)

(72) Inventors: Andrea De Luca, Remanzacco (IT); Carlo Vergano, Villa Carcina (IT); Stefano Del Tedesco, Fontanafredda (IT); Andrea Tonoli, Turin (IT); Carmine Pristera', Turin (IT); Nicola Amati, Turin (IT)

(73) Assignee: Danieli & C. Officine Meccaniche S.P.A., Buttrio (IT)

( * ) Notice: Subject to any disclaimer, the term of this patent is extended or adjusted under 35 U.S.C. 154(b) by 78 days.

(21) Appl. No.: 14/384,127

(22) PCT Filed: Mar. 26, 2013

(86) PCT No.: PCT/IB2013/052386
§ 371 (c)(1),
(2) Date: Sep. 9, 2014

(87) PCT Pub. No.: WO2013/144831
PCT Pub. Date: Oct. 3, 2013

(65) Prior Publication Data
US 2015/0047404 A1 Feb. 19, 2015

(30) Foreign Application Priority Data
Mar. 26, 2012 (IT) .............................. MI2012A0476

(51) Int. Cl.
*F15B 21/00* (2006.01)
*B21B 29/00* (2006.01)
(Continued)

(52) U.S. Cl.
CPC ............ *F15B 21/008* (2013.01); *B21B 29/00* (2013.01); *B21B 37/007* (2013.01); *B21B 37/62* (2013.01);
(Continued)

(58) Field of Classification Search
CPC ......... B21B 13/14; B21B 29/00; B21B 31/32; B21B 37/007; B21B 37/62; B21B 37/64;
(Continued)

(56) References Cited

U.S. PATENT DOCUMENTS 5,140,203 A      8/1992  Reder et al.
5,154,263 A  *  10/1992  Lizell .......................  F16F 9/50
                                                                188/266.2
(Continued)

FOREIGN PATENT DOCUMENTS

DE      102004045100        3/2006
GB           906128         9/1962

*Primary Examiner* — Peter DungBa Vo
*Assistant Examiner* — Joshua D Anderson
(74) *Attorney, Agent, or Firm* — Stetina Brunda Garred & Brucker

(57) ABSTRACT

A vibration damping system by means of a hydraulic actuation system, in particular for rolling mills, comprising at least one hydraulic actuator (1) having a movable part (11) and a corresponding hydraulic feeding circuit (2), and hydraulic damping means (3) for a vibrating force acting on the movable part (11) of the hydraulic actuator (1); the damping means (3) being connected to the hydraulic circuit (2) to actuate a damping of the vibrating force, wherein that the damping means (3) comprise a double chamber cylinder (31) having a first chamber (34) hydraulically connected to the hydraulic circuit (2), and a movable part (35) connected to an electric damping part (32), with the first chamber (34) hydraulically connected to and communicating with the
(Continued)

second chamber (33) of the double chamber cylinder (31) by means of a calibrated pipe (36).

16 Claims, 6 Drawing Sheets

(51) Int. Cl.
  *F16L 55/04* (2006.01)
  *B21B 37/00* (2006.01)
  *B21B 37/62* (2006.01)
  *B23Q 11/00* (2006.01)
  *F16F 15/023* (2006.01)
  *F16F 15/00* (2006.01)

(52) U.S. Cl.
  CPC ....... *B21B 2203/44* (2013.01); *B23Q 11/0032* (2013.01); *F16F 15/007* (2013.01); *F16F 15/023* (2013.01); *F16L 55/041* (2013.01)

(58) Field of Classification Search
  CPC . B21B 38/008; B21B 2203/44; F15B 21/008; F15B 2211/6313; F15B 2211/8613; F16F 9/50; F16F 9/512; F16F 15/002; F16F 15/005; F16F 15/007; F16F 15/023; F16F 15/027; F16F 15/03; F16L 55/041; F16L 55/05; B23Q 11/0032; B23Q 11/0039
  USPC .. 72/10.4, 10.6, 13.3, 13.4, 14.5, 28.1, 28.2, 72/29.1, 29.2, 245, 246, 430, 453.01, 72/453.18, 465.1, 466, 466.7, 707, 710; 60/469

See application file for complete search history.

(56) References Cited

U.S. PATENT DOCUMENTS

| | | | |
|---|---|---|---|
| 2011/0192157 A1* | 8/2011 | Ogawa | B61F 5/245 60/469 |
| 2011/0302976 A1 | 12/2011 | Keintzel et al. | |
| 2012/0000543 A1* | 1/2012 | Keintzel | F15B 21/008 137/12 |

* cited by examiner

VIBRATION DAMPING SYSTEM BY MEANS OF A HYDRAULIC ACTUATION SYSTEM

CROSS REFERENCE TO RELATED APPLICATIONS

The present application claims priority to PCT International Application No. PCT/IB2013/052386 filed on Mar. 26, 2013, which application claims priority to Italian Patent Application No. MI2012A000476 filed Mar. 26, 2012, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a damping system by means of a hydraulic actuation system.

BACKGROUND OF THE INVENTION

Vibration damping systems for mechanical devices or systems by means of electromagnetic or piezoelectric actuators using a hydraulic system for transmitting force are scarce in the background art. Electrostatic technology (based on load control by means of electromagnetic actuators that using the hydraulic circuit as motion transmission system) is used mainly in the aeronautic field for controlling flight systems. A power transmission is required for such an application and therefore the upstream power source is generally a rotating machine (electric motor) connected to a hydraulic pump). The system described above for aeronautic applications has recently been suggested also as actuation system in metalworking machine tools (presses, punches), as actuation systems in the naval sector and as energizing devices on dynamic characterization test jigs. The development of such applications is confirmed by scientific articles published on the topic.

SUMMARY OF THE INVENTION

It is a main object of the present invention to provide an alternative damping system which improves the systems of the known art and guarantees a better overall system simplicity.

It is another object of the invention to provide a vibration damping system which may work effectively also in presence of very high pressures.

A further object of the invention is to provide a damping system which remains inactive for frequencies lower than a predetermined critical frequency and starts working for vibrations of frequency higher than such a critical frequency, thus guaranteeing the damping of predetermined frequency bands.

Such objects are reached by a vibration damping system by means of a hydraulic actuation system which, according to claim 1, comprises:

at least one hydraulic actuator having a movable part, and a corresponding hydraulic feeding circuit, and
hydraulic damping means for a vibrating force acting on the movable part of the hydraulic actuator; said damping means being connected to said hydraulic circuit to actuate a damping of said vibrating force, characterized in that said damping means comprise a double chamber cylinder having a first chamber hydraulically connected to said hydraulic circuit, and a movable part connected to an electric damping part, and in that the first chamber is hydraulically connected to and communicating with a second chamber of the double chamber cylinder by means of a calibrated pipe.

Advantageously, the calibrated pipes works as a low-pass filter being transparent for operating frequencies of the hydraulic actuation system but equally effective in damping a vibrating force.

The vibration damping system of the present invention is based on at least one hydraulic piston having a double chamber cylinder, wherein one of the chambers is connected to and communicating with the feeding circuit of the hydraulic actuator.

This is equivalent to using two single chamber cylinders in which the movable parts are interconnected rather than a double chamber cylinder.

The damping and/or actuation of the hydraulic piston in the double chamber cylinder is achieved by means of an active or passive electric and/or magnetic component.

According to another aspect of the present invention, such an electric component is a piezoelectric actuator which may be pre-loaded according to various techniques which are the object of respective variants of the invention.

Due to such pre-loading, the system object of the present invention may work over a given frequency without interfering with the actuators which are connected to the same hydraulic actuation circuit but work at a frequency rate lower than a predetermined frequency.

A further object of the present invention is to provide a rolling mill which comprises a vibration damping system according to the present invention.

A further aspect of the present invention teaches how to identify a critical frequency of the calibrated pipe.

The claims form integral part of the present description.

BRIEF DESCRIPTION OF THE DRAWINGS

Further features and advantages of the present invention will be apparent in view of the detailed description of a preferred, but not exclusive, embodiment of a vibration damping system by means of a hydraulic actuation system illustrated by way of non-limitative example, with the aid of the accompanying drawings, wherein.

The same reference numbers and letters in the figures refer to the same members or components.

DETAILED DESCRIPTION OF PREFERRED EMBODIMENTS OF THE INVENTION

Figure 1:
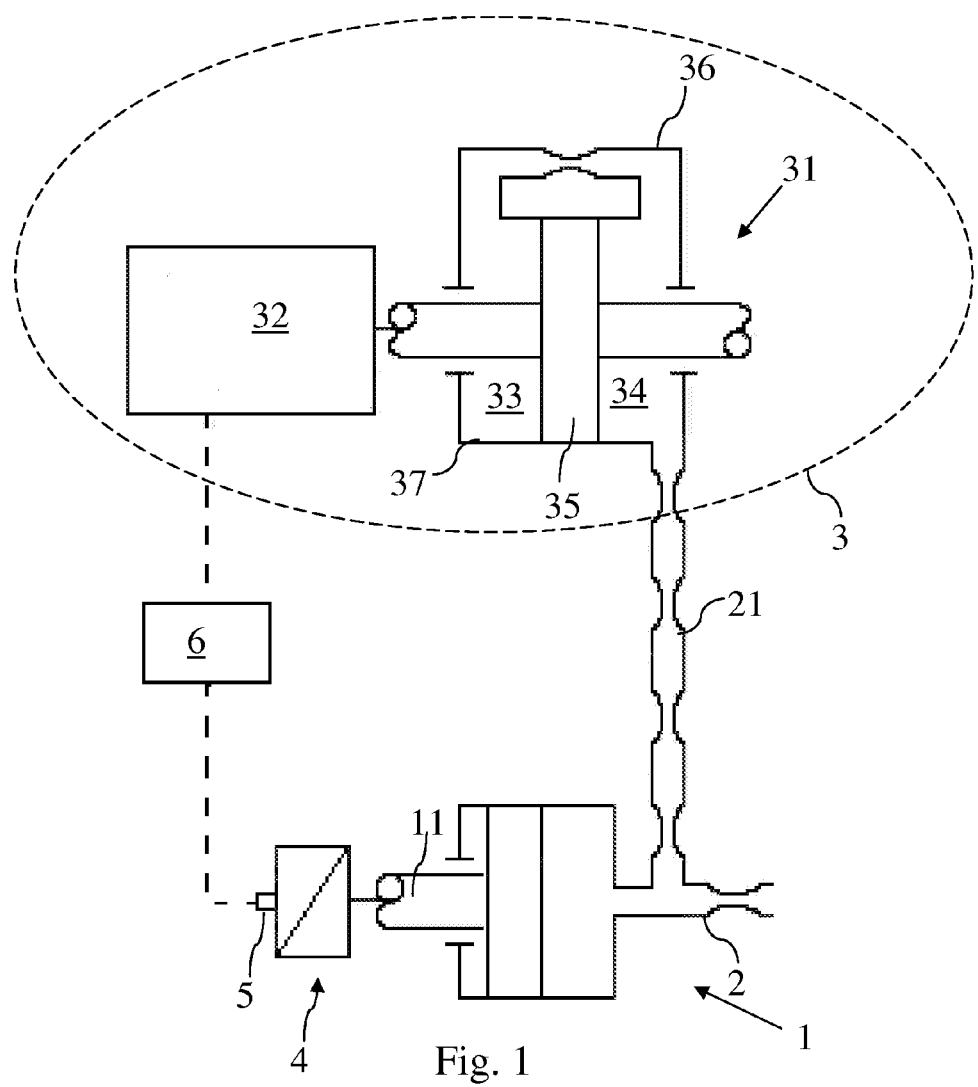
FIG. 1 diagrammatically depicts a damping system comprising a damping device according to the present invention.

FIG. 1 diagrammatically shows a vibration damping system according to the present invention. It comprises a hydraulic actuator 1 having a movable part 11, generally a single-acting actuator, supplied by a corresponding hydraulic circuit 2 (only partially shown in the figure) and a hydraulic damping device 3, also connected, e.g. via a branch, to the hydraulic circuit 2, via branch 21.

The hydraulic actuator 1 pushes a generic object 4 affected by vibrational phenomena according to the pushing direction of the hydraulic actuator 1, that the present invention intends to damp.

Optionally, a shift and/or speed and/or acceleration sensor 5, the signals of which are routed to an electronic control unit 6, which controls the hydraulic damping device 3, is connected to the object 4. Alternatively, the sensor 5 may be replaced by a pressure sensor generically arranged in the hydraulic circuit 2.

The hydraulic damping device 3 comprises a least one hydraulic part 31 and one electric damping part 32.

Figure 2:
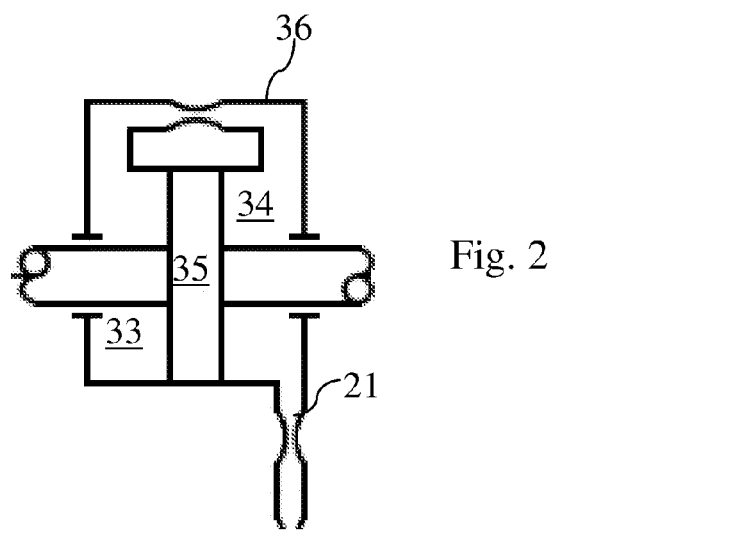
FIG. 2 depicts an enlargement of a part of the damping device in FIG. 1.

The hydraulic part 31, diagrammatically shown in FIG. 2, comprises a hydraulic cylinder 37 having at least two chambers 33 and 34 between which a piston 35 connected to the electric damping part 32 slides.

Chambers 33 and 34 communicate via a pipe 36.

Such a pipe has a calibrated section and may also be named bypass or decoupler hereinafter.

Figure 7:
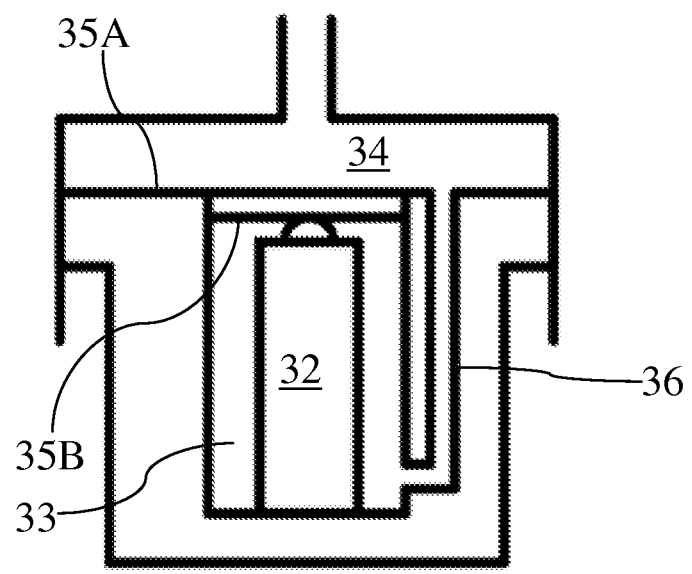

It is shown in most of the figures outside the hydraulic cylinder of the hydraulic part 31, but it may be integrated in the peripheral wall of the cylinder itself or may be obtained in the piston 35 itself, as shown in FIG. 7.

The electric damping part 32 may comprise a piezoelectric actuator or a magnetostrictive or electromagnetic actuator depending on the frequency field in which the damping device must operate and the force intensity that it must generate. Thus, in general, any electric actuator, either active or passive or semi-passive may be used, as explained below.

For example, according to an active configuration, the actuator is electrically powered and controlled by an electronic control unit 6 on the basis of signals received from the sensor 5.

In a semi-active configuration, the electric damping part 32 is an electromagnetic damping in which the electric parameters are controlled by the electronic control unit 6 as a function of the damping action requests. No power module is required in such a configuration in the control unit 6 to drive the electric damping part 32.

In a passive configuration, instead, the electric damping part 32 comprises an electromagnetic damper, the electric parameters of which are fixed. Accordingly, the electronic control unit 6 and the sensor 5 are not present.

Possible forces of frequency lower than a predetermined calibration frequency of the bypass 36, are transmitted to the piston 35 through the hydraulic circuit 2 directly to the chamber 34 and indirectly, via the bypass 36, to the chamber 33 in equal measure; in this case, the bypass behaves as a normal fluid passage pipe allowing to compensate pressure in the two chambers 33 and 34. In this case, the electronic control unit 6 does not transmit controls to the electric damping part 32 because the frequencies are lower than the critical frequency beyond which intervention is desired.

Examples include actuation of the hydraulic actuator 1 itself or slow oscillations, which may be compensated, in all cases, by means of the same hydraulic actuator 1.

The electronic control unit 6 in case of possible forces higher than a predetermined frequency controls the electric damping part 32 so as to contrast these forces. Pressure waves with a frequency higher than the bypass 36 calibration frequency are therefore created in the hydraulic circuit 2, which waves are not transmitted to the chamber 33 because the bypass works as filter and does not allow to equalize pressure in the chambers 33 and 34.

Symmetrically to high frequencies, the activation of the hydraulic control system of the actuator 1, which works at a frequency lower than the decoupler tuning frequency, does not generate pressure waves which could interfere with the action of damping device and could generate a further load on the damping device 3 in the chamber 33. Therefore, the damping system does not react, remaining inactive for frequencies lower than the critical frequency of the decoupler or bypass.

The filtering critical frequency of the decoupler may be appropriately selected. The control unit 6 processes data and establishes when and how to make the electric damping part 32 intervene to provide damping action for the hydraulic actuator 1.

For frequencies higher than the critical frequency of the decoupler, the control unit 6 sends a voltage signal which activates the electric damping part 32.

Preferably, such an electric damping part 32 comprises a piezoelectric actuator.

Hereinafter, reference will be made to the piezoelectric actuator without because of this losing in generality.

The piezoelectric actuator 32 either extends or retracts moving the piston 35 as a consequence and generating positive or negative pressure waves, which also propagate at a frequency higher than critical frequency in the chamber 34, directly connected to and communicating with the hydraulic circuit 2. The amplitude and time range of such pressure waves depends on the amplitude and frequency of the control signal of the control unit 6 which drives the piezoelectric actuator 32.

The decoupler 36, as calibrated, works as a filter preventing the pressure waves generated by the piston 35 from closing in the chamber 33, thus being compensating locally. Such pressure waves are propagated along the circuit 2 to the hydraulic actuator 1, to compensate the force which made the electronic control unit 6 intervene.

Accordingly, the object 4 remains immune to stresses having frequency higher than the aforesaid calibration frequency (also named critical frequency) of the decoupler and the control unit.

The amplitude of the pressure waves which act on the hydraulic actuator 1 depend on the dynamics of the entire hydraulic and mechanical system.

Advantageously, use of the bypass pipe 36 allows the damping device 3 to work at very high pressures without the piezoelectric actuator 32 being damaged in any manner. This is because the piston 35 is constantly balanced for forces having frequency equal to zero or in all cases lower than the aforesaid critical frequency.

Advantageously, when the piezoelectric actuator 32 intervenes, it is called to contrast only the pressure waves determined by the vibration force induced on/by the object for the piston 35 and not relative pressure with respect to the environment established in the hydraulic circuit 2, thus maintaining a high efficiency of the damping system.

Figure 5:
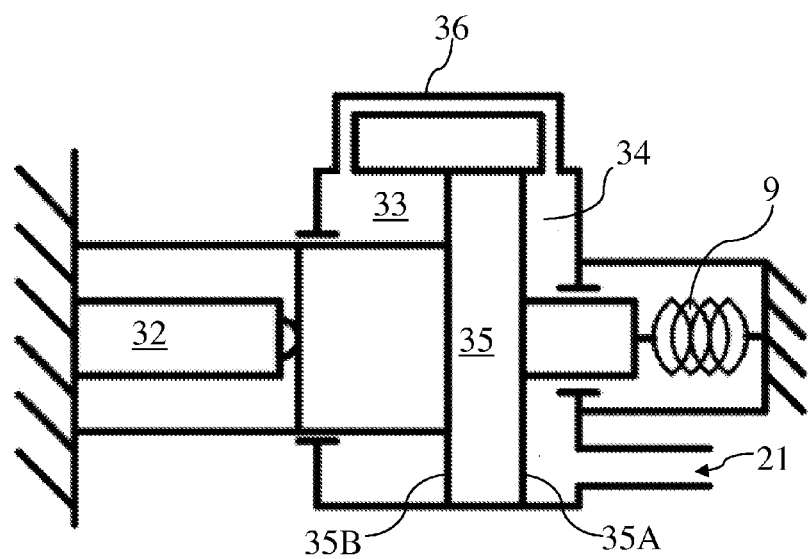
Figure 6:
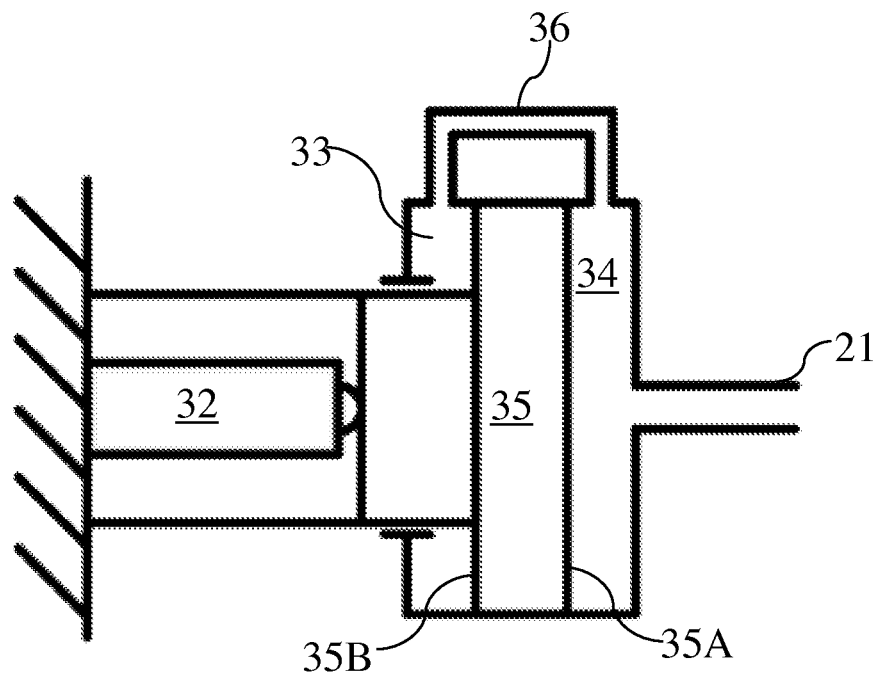

The piezoelectric actuator may be installed either outside the hydraulic part 31 of the damping device 3, as shown in FIGS. 1, 5 and 6, or inside, as shown in figures from 3, 4 to 7. It may be installed in either of the two chambers 33 and 34.

Preferably, the working area being equal, the volume of the chamber 34 is smaller than the chamber 33. According to a preferred embodiment of the invention (not shown) the actuator 32 can be assembled in the chamber 34. Preferably, the volume of the chamber 34 is as small as possible. In this manner, the movements of the piston 35 translate into a greater effect on pressure variation in the hydraulic circuit 2 to compensate vibrations. Vice-versa, preferably, the volume of the chamber 33 is as large a possible so as to have a lesser reaction by the chamber itself during piston 35 activation. In this manner, only a minimum part of the energy impressed by the actuator 32 is dissipated by the chamber 33, whilst most of it is translated into pressure waves injected into the hydraulic circuit 2. This synergistically contributes to making the damping system particularly effective.

The dimensional ratio between the chambers is preferably at least 10.

According to another aspect of the present invention, such a piezoelectric actuator may be pre-loaded according to various techniques which are the object of corresponding variants of the invention illustrated below. This is particularly useful in case of a piezoelectric actuator, because such actuators require a pre-compression in order to work in the best manner.

According to a first variant, pre-load on the piezoelectric actuator 32 is obtained by differentiating the surface of the piston 35 facing the opposite chambers 33 and 34. According to a second variant, pre-load is obtained by means of a pre-load spring. A third variant is obtained as a combination of the first two.

Figure 3:
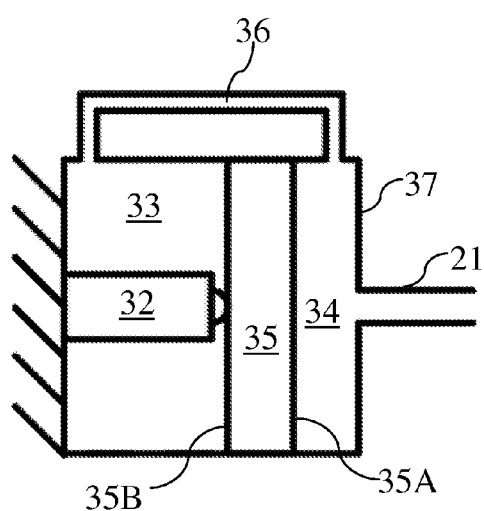
FIGS. 3-7 depict variants of the part of the damping device shown in FIG. 2.

With particular reference to FIG. 3, the piezoelectric actuator 32 is inserted in the chamber 33. The surfaces 35A and 35B of the piston facing the two chambers, 34 and 33, respectively, are equal, whilst volume of chamber 34 is smaller than volume of chamber 33.

Figure 4:
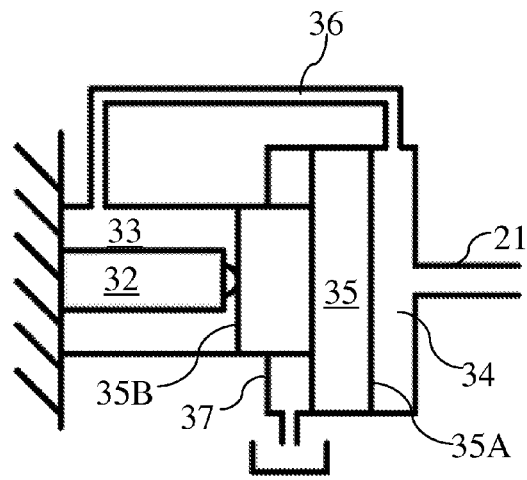

FIG. 4 shows a variant in which not only volume of chamber 34 is smaller than volume of chamber 33, but also the surface 35A of the piston facing chamber 34 is greater than the surface 35B facing chamber 33.

Also in the variants of the corresponding FIGS. 5 and 6, the surface 35B facing chamber 33 is smaller than the surface 35A facing chamber 34.

Surfaces 35A and 35B are the equivalent active surfaces of the piston/cylinder coupling.

In FIG. 5, the piezoelectric actuator is outside the chamber 33, and is further used a pre-load spring 9, e.g. inserted in the chamber 34 and interposed between a wall or a gap obtained in the wall of the cylinder and the face 35A of the piston. The presence of the pre-load spring 9 is independent from the presence of a difference between amplitudes of the surfaces 35A and 356B.

Figure 5A:
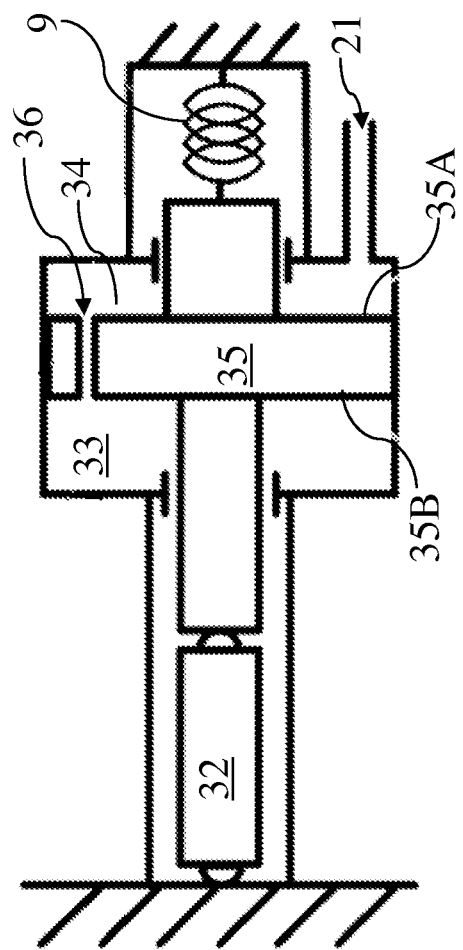

FIG. 5A shows a further variant made according to the FIG. 5. The calibrated pipe 36 is made by means of a passage formed in the cylinder/piston coupling itself. According to a preferred variant, such a passage is located in an angular sector of the coupling (see FIG. 5A). According to another preferred variant (not shown) the passage is distributed along the entire perimeter (circumference) of the movable part.

The feature according to which the pipe 34 is made by means of the cylinder-piston coupling itself may be combined with any of the variants described in the present invention. Therefore, hereinafter, the words pipe and passage are interchangeable.

In FIG. 6, with respect to the preceding FIG. 5, the pre-load is guaranteed by only the difference of amplitude of the surfaces 35A and 35B of the piston 35.

With reference to FIG. 7, the actuator 32 is installed in a specific cavity obtained in the piston 35. The decoupler 36 is also obtained in the piston 35. The pre-load on the actuator may be achieved by means of a difference between areas 35A and 35B on the piston 35. A piezoelectric actuator 32 is particularly indicated for such a variant because of the high force density of such devices and because the dimensions are closely correlated to the dimensions of the actuator.

Figure 8:
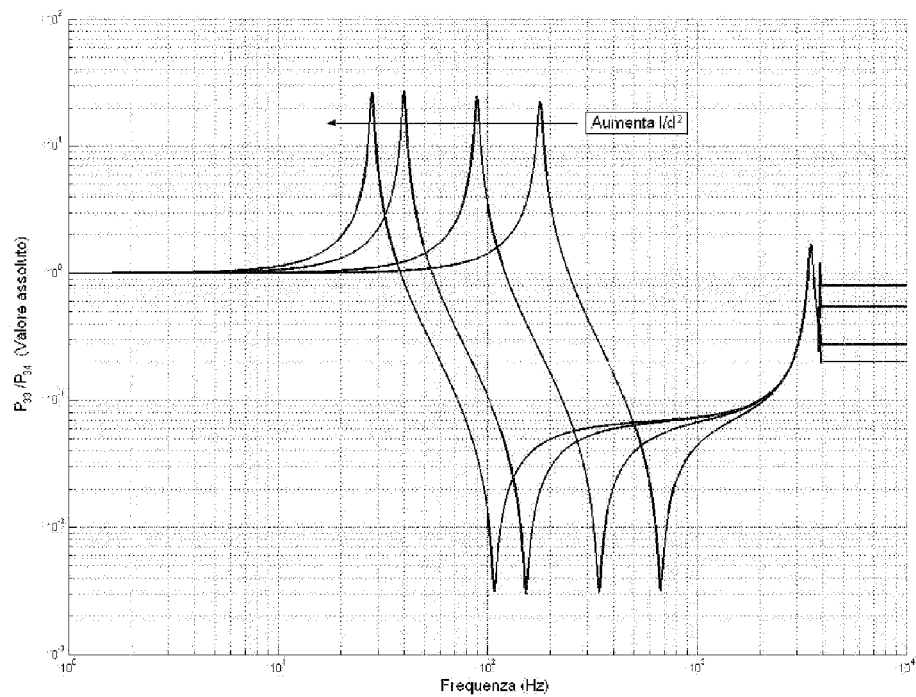
FIG. 8 shows a transfer function chart of a damping system component according to the preceding figures plotted as a dimensional parameter of the component itself varies.

FIG. 8 plots the pressure ratio in the two chambers 33 and 34 of the hydraulic part in the damping device. Such a ratio between two pressures depends on the dynamic performance of the decoupler 36, which depend on its geometric features (mainly length and diameter). Such a dynamic performance is mainly determined by a natural frequency or resonance peak. FIG. 8 shows decoupler transfer function as the geometric features of the decoupler vary, in particular the decoupler length/diameter squared.

The transfer function shifts towards the left of the chart, i.e. towards the lower frequencies as such a parameter increases. Four transfer functions with resonance frequency of 40, 20, 2 and 1 Hz respectively are plotted.

Each transfer function chart shows a step pattern, so that pressures in the two chambers 33 and 34 are equivalent at frequencies lower than the resonance frequencies, being their ratio on the abscissa $10^0=1$, whilst such a ratio decreases greatly and stabilizes at a value of 1/50 for pressures higher than the resonance frequency. This pattern may be easily associated to a behavior such as a low-pass filter of the decoupler 36. Between the two flat segments, the function finally shows a brief transient characterized in this case by a double cusp: from left to right, the first cusp is upward followed by a downward cusp.

As mentioned, the length and diameter features of the decoupler determine the resonance frequency, i.e. the frequency threshold over which equalization between the two chambers 33 and 34 of the cylinder 37 of the hydraulic part 31 is no longer obtained, i.e. the passage of the pressure waves generated by the intervention of the piezoelectric actuator is prevented.

The discriminating parameters is the ratio between the length of the bypass pipe and its diameter squared: $1/d^2$. FIG. 8 again shows that the decoupler can filter gradually lower frequencies as this parameter increases. Therefore, by appropriately determining this ratio according to the predetermined critical frequency the low-pass filter features of the decoupler are determined.

Application Example

The various applications of the invention include an advantageous application in the hydraulic circuit of a cold rolling mill stand for steel strips. This type of rolling mill stands, as all mechanical components, have natural resonance frequencies. Vibration phenomena may be induced if the forces due to wear, friction, conformation of the strip itself or other have frequencies either close to or coinciding with the natural resonance frequencies. Such phenomena appear as a movement of the rolls in direction perpendicular to the rolling direction, i.e. in vertical direction, and may reach uncontrollable amplitudes not suited to the rolling process. This is known as "chattering" and may generate surface faults, such as light/dark marks on the strip or variations of thickness which cause the rejection of the rolled strip, the faults depending on the vibration mode of the mill stand.

The resonance frequencies to be avoided being known, it is possible to use the device described here to solve this problem in a rolling mill stand. In this specific case, the objective of the vibration damping system according to the invention is to damp vibrations characterized by a frequency higher than 100 Hz; an electric actuator 32 adapted to work at these frequencies is therefore provided, which actuator is activated based on the measurements of an accelerometer 5 placed on the chocks 20 of the cylinders(s) 1, 1', 1", 1'" of the mill stand. The critical frequency of 100 Hz is here identified because the servo valve controlling the pressure in the chambers of the hydraulic bending cylinders 1-1'" do not work at frequencies higher than 50 Hz in order to obtain the required elastic deformation of the rolls. Of course, such a value may be changed on a case-by-case basis. Therefore, choosing 100 Hz as critical working frequency of the dampening system guarantees NON interference between the damping system and the control system of the elastic deformation of the rolls.

Figure 9:
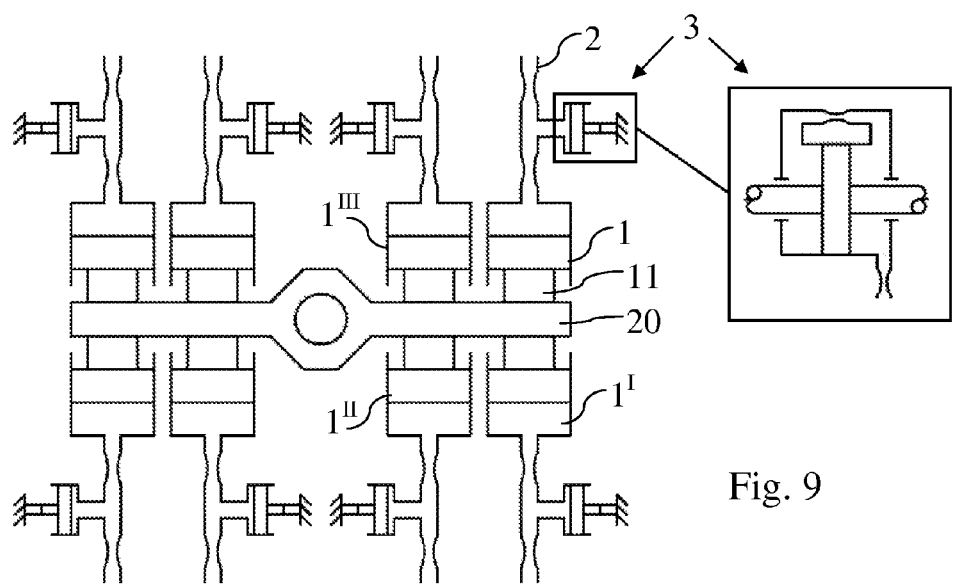
FIG. 9 diagrammatically shows an embodiment of the damping system at the chocks of a rolling mill stand.

As shown in FIG. 9, a number of damping devices 3 equal to the number of bending pistons is appropriate in this type of application, in order to actively damp the vibrations of the rolling mill stand, typically eight pistons 1 and therefore eight damping cylinders 3. The sensor 5 and the control unit 6 may be shared by two or more damping devices 3 to control the corresponding electric dampers 32.

Vibration Damping System Exemplary Embodiment

Figure 10:
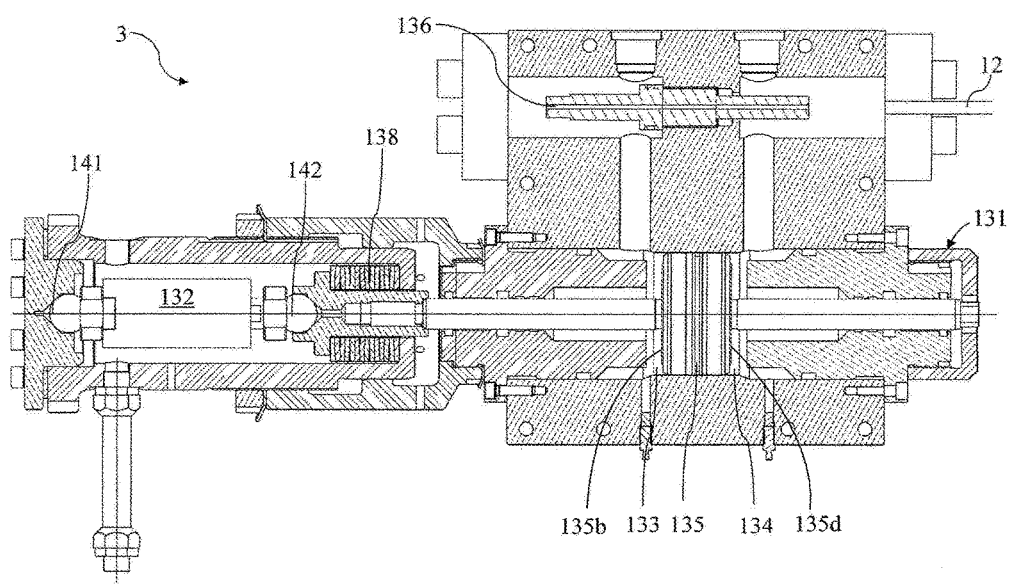
FIG. 10 shows a longitudinal section of an embodiment of a damping device according to the present invention.

An exemplary embodiment of the vibration damping system comprises a piezoelectric actuator 132 and a damping cylinder 131 with decoupler 136, as shown in FIG. 10.

For low frequencies, the decoupler 136 behaves as a normal connection pipe (bypass) and allows to equalize pressure in the two chambers, i.e. between the two sides 135b and 135d of the piston 135, so as to relieve the hydraulic circuit pressure from the piezoelectric actuator 132.

In order to apply pulling and pushing loads of equal entity during the steps of activity of the damping system, the piezoelectric actuator 132 is half pre-loaded of the achievable force using a spring pack 138. The pre-load may be changed by means of setting shims. In this manner, it is possible to exploit both the elongation of the piezoelectric actuator 132, which induces a displacement of the piston 135 towards the actuation chamber 134 and causes an increase in the pressure in this chamber, and consequently a positive pressure wave which propagates in the circuit 12, and the reduction of the length of the piezoelectric actuator length 132, which retracts in the pushing direction of the spring pack 138, displaces the piston 135 towards the chamber 133, causing a decrease of pressure in the actuation chamber 134 and consequently a negative pressure wave which propagates along the circuit 12.

The exemplary embodiment shown in FIG. 10 further includes the presence of ball joints 141 and 142 on the two ends of the piezoelectric actuator 132 according to the distension-retraction axis thereof, so as to avoid subjecting the piezoelectric actuator 132 to possible axial traction loads with respect to which its resistance is zero. Indeed, the ball joint 142 allows the piezoelectric actuator 132 to be detached from the spring pack 138 if a negative pressure wave reaches chamber 134 by means of the hydraulic cylinder 12 such that the piston 135 is pulled towards the chamber 134.

The piezoelectric actuators are generally activated with an electric voltage which may vary, for example, from 0 to 1000 V and, based on the perceived voltage, a proportional elongation is obtained, e.g. from a minimum of 0 to a maximum of 80 μm. Advantageously, the piezoelectric actuator 132, in rest position, is already subjected to a medium voltage between minimum and maximum voltage, i.e. 500 V, and therefore may undergo either an elongation or a contraction of entity equal to half of the maximum value, i.e. 40 μm. In this manner, the control unit 6, based on the measurements obtained by the sensor 5, may control the piezoelectric actuator 132 by either increasing or decreasing the electric voltage, thus either extending or retracting the piezoelectric actuator 132 so as to cause a positive or negative pressure wave in the chamber 132, according to needs.

The elements and features illustrated in the various embodiments may be combined without because of this departing from the scope of protection of the invention.

The invention claimed is:

1. A vibration damping system by means of a hydraulic actuation system, comprising:
at least one hydraulic actuator having a movable part, and a corresponding hydraulic feeding circuit which supplies said hydraulic actuator, and
hydraulic damping means for a vibrating force acting on the movable part of the hydraulic actuator; said damping means being connected to said hydraulic circuit to actuate a damping of said vibrating force,
and characterized in that said damping means comprise a double chamber cylinder having a first chamber hydraulically connected to said hydraulic circuit, and a movable part connected to an electric damping part, and in that the first chamber is hydraulically connected to and communicating with a second chamber of the double chamber cylinder by means of a calibrated pipe or passage having a length and a diameter defining a critical frequency of the calibrated pipe, wherein according to the length and diameter of the calibrated pipe, a pressure wave propagation towards the second chamber is allowed to pass through the calibrated pipe allowing equalization of pressure in the first and second chambers in relation to frequencies lower than the critical frequency of the calibrated pipe and inhibited to pass through the calibrated pipe preventing equalization of pressure in the first and second chambers in relation to frequencies higher than the critical frequency of the calibrated pipe, thereby actuating the hydraulic damping means to dampen the pressure wave propagation.

2. A damping system according to claim 1, wherein said first chamber has a smaller volume than a volume of said second chamber.

3. A system according to claim 2, wherein a ratio between the volume of said first chamber and the volume of said second chamber is at least 10.

4. A damping system according to claim 1, wherein said movable part comprises a first face projecting into the first chamber and a second face projecting into the second chamber, and wherein the surface of said first face is larger than the surface of the second face.

5. A damping system according to claim 1, wherein said electric damping part is arranged inside one of the two chambers.

6. A damping system according to claim 4, wherein said electric damping part comprises a piezoelectric actuator, and wherein a difference of the surfaces of said first face and of said second face is adapted to achieve a pre-load for the piezoelectric actuator.

7. A damping system according to claim 6, wherein the system comprises a pre-loading spring acting on the piezoelectric actuator to define a pre-load thereof.

8. A damping system according to claim 1, wherein said electric damping system is of the passive magnetic-electric type.

9. A system according to claim 1, wherein operating parameters of said electric damping part are controllable, and wherein the damping system further comprises an electronic control unit connected to a sensor for measuring
 a movement and/or speed and/or acceleration of the movable part of the hydraulic actuator and/or
 a pressure in the hydraulic circuit,
so as to control said operating parameters.

10. A damping system according to claim 9, wherein said control unit is programmed to control the damping effect of said electric damping part when said sensor detect a vibrating frequency which is higher than said critical frequency.

11. A damping system according to claim 1, wherein said electric damping part comprises an active electric actuator, and wherein the damping system further comprises an electronic control unit connected to a sensor for measuring
 a movement and/or speed and/or acceleration of the movable part of the hydraulic actuator and/or
 a pressure in the hydraulic circuit,
so as to control said active actuator.

12. A damping system according to claim 11, wherein said electric damping part comprises a piezoelectric actuator, and wherein the system comprises a pre-loading spring acting on the piezoelectric actuator to define a pre-load thereof.

13. A damping system according to claim 11, wherein said control unit is programmed to control the damping effect of said electric damping part when said sensor detect a vibrating frequency which is higher than said critical frequency.

14. A damping system according to claim 1, wherein said passage is made in a coupling of said double chamber cylinder and said movable part.

15. A damping system according to claim 14, wherein said passage is either located in an angular sector of said coupling or is distributed along an entire perimeter of said movable part.

16. A rolling mill comprising at least one mill stand and at least one hydraulic actuator for the bending control and at least one corresponding damping system according to claim 1.

* * * * *